United States Patent [19]
Ko et al.

[11] Patent Number: 5,321,507
[45] Date of Patent: Jun. 14, 1994

[54] MOTION SIGNAL DETECTING CIRCUIT

[75] Inventors: Jung W. Ko, Kyunggi-do, Rep. of Korea; Christopher H. Strolle, Glenside, Pa.

[73] Assignee: SamSung Electronics Co., Ltd., Kyungki-do, Rep. of Korea

[21] Appl. No.: 711,981

[22] Filed: Jun. 7, 1991

[30] Foreign Application Priority Data

Nov. 27, 1990 [KR] Rep. of Korea ............... 90-19287

[51] Int. Cl.⁵ ............................................. H04N 7/18
[52] U.S. Cl. .................................. 348/427; 348/340; 348/341; 348/607; 348/431
[58] Field of Search ............... 358/31, 105, 36, 37, 358/166, 167, 11, 12, 13, 310, 314, 328, 329, 330, 334, 141, 21 R, 138, 16, 17; H04N 9/64, 7/18

[56] References Cited

U.S. PATENT DOCUMENTS

| | | | |
|---|---|---|---|
| 4,692,801 | 9/1987 | Ninomiya et al. | 358/138 |
| 4,831,463 | 5/1989 | Faroudja | 358/12 |
| 4,868,650 | 9/1989 | Weckenbrock | 358/31 |
| 4,972,259 | 11/1990 | Motoe et al. | 358/36 |
| 4,982,271 | 1/1991 | Sugiyama et al. | 358/31 |
| 5,031,030 | 7/1991 | Hurst, Jr. | 358/12 |
| 5,083,203 | 1/1992 | Ko et al. | 358/167 |
| 5,113,262 | 5/1992 | Strolle et al. | 358/323 |

Primary Examiner—James J. Groody
Assistant Examiner—Michael H. Lee
Attorney, Agent, or Firm—Robert E. Bushnell

[57] ABSTRACT

A motion signal detection circuit adapted to a video recording/reproducing apparatus having a frequency unfolding circuit for unfolding a luminance signal of a high frequency component included in the luminance signal of a low frequency component into an original frequency band, comprising a prefilter for eliminating the folding carrier and sidebands thereof included in the video signal unfolded by the frequency unfolding circuit, a comb filter for filtering the output of the prefilter to detect a motion signal, an error compensation circuit for compensating the errors included in the motion signal output from the comb filter.

32 Claims, 4 Drawing Sheets

MOTION SIGNAL DETECTING CIRCUIT

BACKGROUND OF THE INVENTION

The present invention relates to a system for smoothing or spreading transitions between image regions in television signals. The signals to be transmitted are processed in a still picture signal processing method and in a motion picture signal processing method. Particularly, the present invention is a circuit for accurately detecting a motion signal which represents a moving image so as to control the transitions between image regions of a frequency-unfolded image signal.

Standard television systems such as an NTSC or a PAL system process a television signal adaptively in accordance with an amount of motion in of the signal. This adaptive processing of the signal may result in some quasi-motion picture regions between image regions being processed in a still picture signal processing method and other image regions being processed in a motion picture signal processing method. If differences in the processing methods used in different regions are perceptible to a viewer, or if the transitions between the different regions are discerned by a viewer, image quality if degraded.

As an example of such adaptive processing for the purpose of separating chrominance and luminance components from a composite video signal, a frame comb filter or a line comb filter may be used. As long as there is no change in the image signal at frame time intervals, chrominance and luminance components from the composite video signal can be completely separated, using the frame comb filter. If the scene changes over the frame time intervals, then some color information will be present in the separated luminance component, and some brightness information will be present in the chrominance component.

A line comb filter, also used to separate the luminance and chrominance components from the composite video signal, does not produce significantly degraded component signals in the presence of image motion. However, the line comb filter reduces the vertical resolution of the reproduced image more than the frame comb filter. In addition, in locations where a vertical transition occurs, an image processed by the line comb filter may be degraded due to both color information being introduced into the luminance component, producing an image artifact known as hanging dots, and brightness information being introduced into the chrominance, producing incorrect colors in the neighborhood of the transition.

Therefore, the television signal should be adaptively processed by detecting the presence or absence of image motion. In the regions in which the image is stationary, the frame comb filter is used, and in the regions in which the image is moving, the line comb filter is used.

An example of adaptive processing is an adaptive double-scanned, non-interlaced scan converter. In such a converter, interstitial lines are displayed between lines of the current field. However, the interstitial lines may be those transferred from the preceding field in the presence of image changes producing visible artifacts such as serrated contours. The interstitial lines may also be interpolated from lines within the current field, but the vertical resolution is reduced, and line flicker may occur. In regions in which image changes are detected, intrafield interpolated interstitial lines are displayed and field-delayed interstitial lines are displayed in other way.

Yet another example of such adaptive processing is adaptive peaking circuitry in which regions having relatively high noise are processed with a relatively low peaking factor and regions having relatively low noise are processed with a relatively high peaking factor.

In the above examples, the television signals are processed adaptively in response to the values of estimated parameters of the image. The parameters are motion, in the case of luminance/chrominance separation or of double scanning non-interlaced conversion, and a relative level of noise, in the case of the peaking. Differently processed regions, and noticeable boundaries between regions where the parameter is present and those where it is absent are undesirable artifacts introduced by the above types of adaptive processing types.

U.S. Pat. No. 5,113,262 issued May 12, 1992, to the inventors and others; entitled "AN IMPROVED VIDEO SIGNAL RECORDING SYSTEM" and assigned to Samsung Electronics Co., Ltd., describes a recording system for recording and reproducing a full bandwidth video signal on and from a recording medium having a limited bandwidth by folding the high frequency component of a luminance signal into the low frequency component of the luminance signal.

In U.S. Pat. No. 5,113,262 a motion signal which represents a moving image is recorded together with the folded luminance signal and the chrominance signal on the recording medium. The motion signal is used to control the transition between regions of the full bandwidth luminance signal which is unfolded into the original frequency bands during reproduction.

That is, in the previous work of the inventors and their coworkers, the high frequency component of the luminance signal is folded into the low frequency component of the luminance signal during recording. At this time, the high frequency component of the luminance signal is modulated by a folding carrier, so that the folded luminance signal has a phase difference of 180 degrees between frames, between scanning lines, and between pixels.

Accordingly, in reproducing, the high frequency component folded into the low frequency component of the folded luminance signal is demodulated by the unfolding carrier having the same phase and frequency as those of the folding carrier, so that the high frequency component of the luminance signal is unfolded into the original frequency band.

However, the folding carrier and the sideband thereof will be present in the unfolded luminance signal. The resultant luminance signal unfolded by the folding carrier and the sidebands thereof has a phase difference of 180 degrees between frames.

As a result, the conventional motion signal detecting circuit, for detecting the level difference of pixels between frames in the motion signal, has difficulty detecting accurately the motion signal from the unfolded luminance signal, due to the phase off-set between frames.

U.S. patent application Ser. No. 07/711,980 filed Jun. 7, 1991, by the inventor Ko and entitled "MOTION DETECTING CIRCUIT" corresponds to Korean patent application No. 90-18737 filed Nov. 19, 1990. These patent applications describe techniques, for eliminating the folding carrier and sidebands thereof, contained in the unfolded luminance signal by a prefilter and for detecting a motion signal through filtering, by means of a comb filter, the unfolded luminance signal in which the folding carrier and the sidebands are eliminated.

However, the above prefilter can eliminate the folding carrier and sidebands thereof contained in the unfolded luminance signal of the vertical and horizontal direction having a large correlation. But it is difficult to completely eliminate the folding carrier and sidebands thereof contained in the unfolded luminance signal in the diagonal direction, that is, the temporal direction having a small correlation.

Therefore, since the unfolded luminance signal which is output from the prefilter has a phase difference of 180 degrees from the folding carrier and sidebands remaining in the diagonal signal component, it is difficult to derive an accurate value for the diagonal direction of the motion signal, which is the difference component between flames detected by the comb filter.

SUMMARY OF THE INVENTION

It is an object of the present invention to provide a circuit for accurately detecting a motion signal which represents a moving image in a picture scene from the unfolded video signal.

The present invention achieves the above object by providing a motion signal detecting circuit comprising:
an input line for inputting the unfolded video signal;
means for eliminating the folding carrier and sidebands thereof contained in the unfolded video signal;
first comb filter means for detecting a motion signal being the difference component of the unfolded video signal by filtering the output of the eliminating means; and
means for compensating errors contained in the motion signal detected by the first comb filter.

BRIEF DESCRIPTION OF THE DRAWING

The object and features of the present invention will become more readily apparent by the following detailed description of the preferred embodiment in conjunction with the accompanying drawing in which.

DETAILED DESCRIPTION OF THE INVENTION

Figure 1:
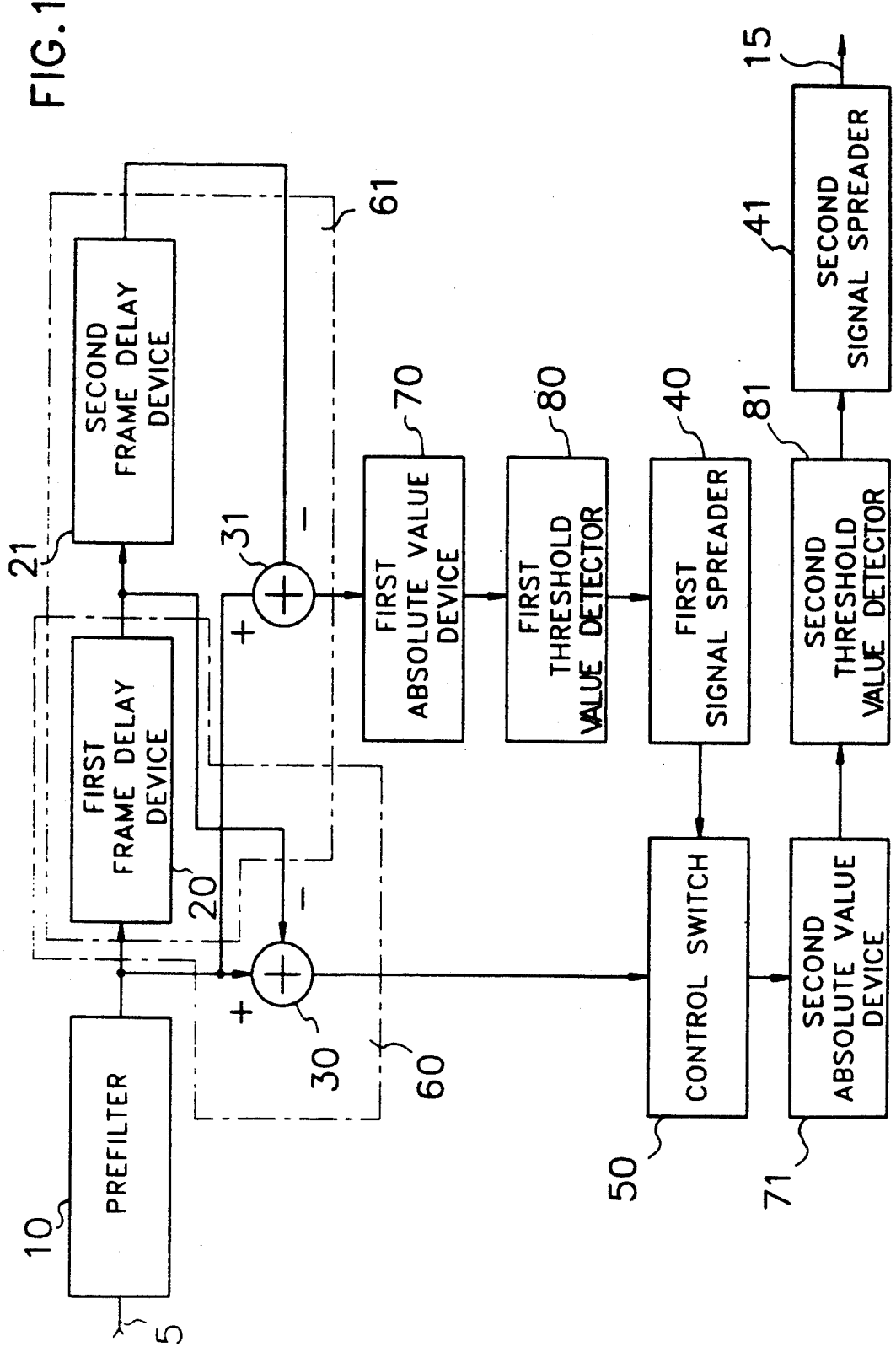
FIG. 1 is a block diagram of a preferred embodiment of a motion signal detecting circuit according to the invention.

In FIG. 1, an input line 5 is connected to the output of a frequency unfolding circuit (not shown) for the purpose of inputting the unfolded luminance signal and connected to the input of a prefilter 10, An output terminal of the prefilter 10 is connected to an input terminal of a first frame delay device 20, a first input terminal of a first subtracter 30 and a first input terminal of a second subtracter 31. An output terminal of the first frame delay device 20 is connected to an input terminal of a second frame delay device 21 and a second input terminal of the first subtracter 30. An output terminal of the second frame delay device 21 is connected to the second input terminal of the second subtracter 31. An output terminal of the first subtracter 30 is connected to an input terminal of control switch 50. An output terminal of the second subtracter 31 is connected to an input terminal of a first absolute value device 70. An output terminal of the first absolute value (or magnitude) device 70 is connected to the input terminal of a first threshold value detector 80, An output terminal of the first threshold value detector 80 is coupled to the input terminal of a first signal spreader 40. An output terminal of the first signal spreader 40 is coupled to the control terminal of the control switch 50. An output terminal of the control switch 50 is connected to an input terminal of a second absolute value device 71. An output terminal of the second absolute value device 71 is coupled to an input terminal of a second threshold value detector 81. An output terminal of the second threshold value detector 81 is connected to an input terminal of a second signal spreader 41. An output terminal of the second signal spreader 41 is connected through an output line 15 to a control terminal of a soft switch (not shown) for mixing the spatially processed luminance signal with a temporally processed luminance signal.

Here, a portion 60, including the first subtracter 30 and the first frame delay device 20, constitutes first comb filter circuitry, and a portion 61, including the second subtracter 31, fast and second frame delay devices 20 and 21, constitutes second comb filter circuitry.

The unfolded luminance signal which is fed to the input line 5 includes the folding carrier and the sidebands.

In operation, the prefilter 10 eliminates the folding carrier and sidebands contained in the unfolded luminance signal by filtering the unfolded luminance signal being input through input line S. The circuit diagram of the prefilter 10 is described in the Korean patent application number 90-17610, corresponding to the U.S. patent application Ser. No. 07/562,907, the invention entitled "An improved apparatus for eliminating the folding carrier and sidebands for the unfolded video signal", filed on Aug. 6, 1990, by the inventors and another which may be desirably comprised of the circuit as shown in FIG. 2.

Figure 2:
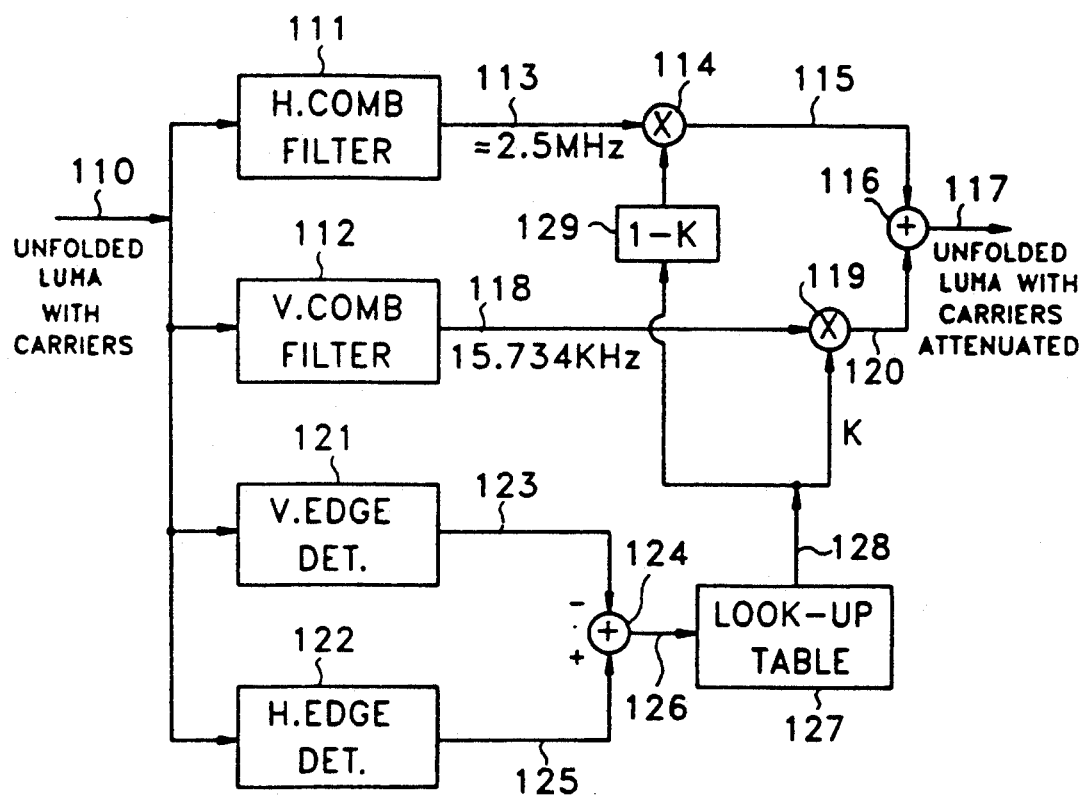
FIG. 2 is a detailed circuit diagram of a prefilter adapted for use in the FIG. 1 motion signal detecting circuitry, which signal spreader is of the type shown in U.S. patent application Ser. No. 07/562,907 filed Aug. 6, 1990, by the inventors and another.

Referring to FIG. 2, equal amplitudes of the unfolded luminance signal on input line 110 are passed through the horizontal comb filter 111 and the vertical comb filter 112, and, unless affected by multipliers 114 and 119, equal amplitudes of the two signals are combined in adder 116 and the sum is available at the output 117. The horizontal comb filter 111 is designed to cancel the sidebands of the folding at or above 2.5 MHz, and the vertical comb filter 112 is designed to cancel the line frequency of 15,714 Hz. However, the cancellations of the carrier and sidebands may be incomplete since they are affected by the brightness variations in the scanned picture.

Cancellations of the horizontal and vertical carriers on the output line 117 are achieved by the operation of the vertical scan edge detector 121 and the horizontal scan edge detector 122. When a "vertical" edge or discontinuity is detected during a vertical scan, a signal over line 123 and through subtracter 124 to the look-up table 127 causes a signal having a value of K over line 128 from look-up table 127 to increase the proportion of the output at 117 from the horizontal comb filter 111, whose output is not affected by the vertical edge, and decrease the proportion from the vertical comb filter 112. Likewise, when a "horizontal" edge is detected during a horizontal scan, a signal over line 125 and through subtracter 124 causes a signal having a value of K over line 128 both to increase the proportion of the output at 117 from the vertical comb filter 112 whose output is not affected by the horizontal edge, and decrease the proportion from the horizontal comb filter 111. In each case, the cancellation of carrier components is improved by increasing the output proportion from the comb filter whose output least affected by the brightness edge encountered.

In FIG. 1, the first frame delay device 20 delays by a period of one frame the unfolded luminance signal from which the folding carrier and sidebands are eliminated, and supplies it to the first subtracter 30 and the second frame delay device 21.

The second frame delay device 21 further delays the output of the first frame delay device 20 by a period of one more frame.

The first subtracter 30 subtracts the output of the first frame delay device 20 from the output of the prefilter 10, and generates the difference signal between flames of the unfolded luminance signal.

The second subtracter 31 subtracts the output of the second frame delay device 21 from the output of the prefilter 10 and generates the difference signal between alternate frames of the unfolded luminance signal.

Since the difference signal generated from the first subtracter 30 results in a sum signal between frames, due to the folding carrier remaining in the diagonal direction of the unfolded luminance signal without being completely eliminated by the prefilter 10, the image appears to move even if it does not actually move. Even if the folding carrier remains in the diagonal direction of the unfolded luminance signal without being completely eliminated by the prefilter 10, the difference signal between alternate frames, generated from the second subtracter 31, has the accurate difference value of the components between frames.

The first absolute value device 70 receives the difference signal between alternate flames of the unfolded luminance signal which is the output of the second subtracter 31 having positive or negative values according to the moving direction and the brightness of the video signal and changes it to a positive value.

The first threshold value detector 80 compares the output of the first absolute value device 70 with a predetermined threshold value, and generates the motion signal having a value of "1" for a larger signal than the predetermined threshold value, and a value of "0" for a smaller signal than the predetermined threshold value, or vice versa.

The first signal spreader 40 processes a motion signal based upon the difference signal between alternate frames of the unfolded luminance signal generated in the first threshold value detector 80 to be spread in both vertical and horizontal directions, and generates a motion signal based upon the difference signal between alternate frames of the spread, unfolded luminance signal. The first signal spreader 40 can be constructed in the same manner as the signal spreader described in U.S. Pat. No. 5,083,203 issued Jan. 21, 1992, to the inventor Ko and another; entitled "CONTROL SIGNAL SPREADER" and assigned to Samsung Electronics Co., Ltd. which may be desirably comprised of the circuit as shown in FIG. 3.

Figure 3:
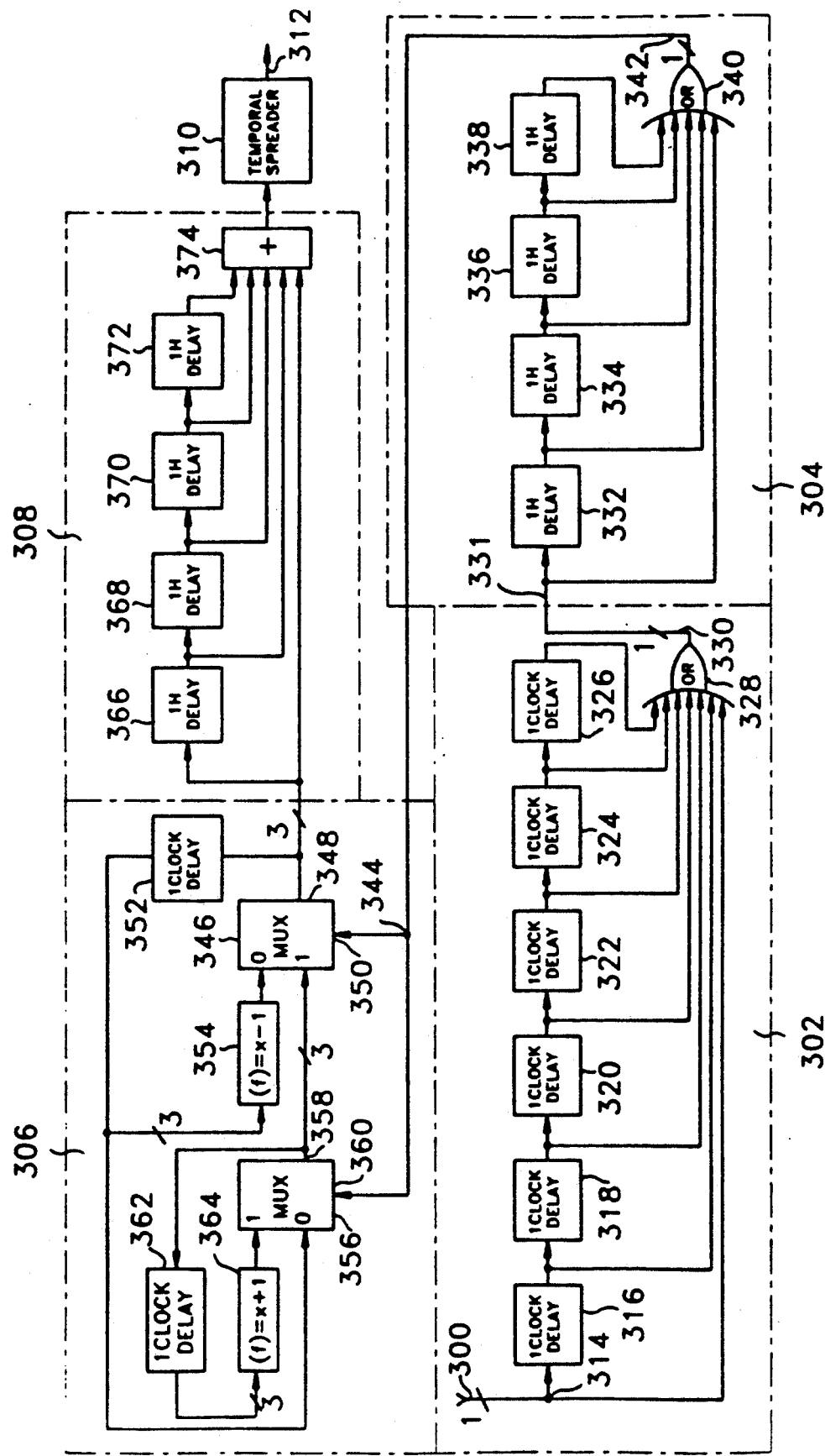
FIG. 3 is a detailed circuit diagram of a signal spreader adapted for use in the FIG. 1 motion signal detecting circuitry, which signal spreader is of the type shown in U.S. Pat. No. 5,083,203 issued Jan. 21, 1992, by the inventor Ko and another.

Referring to FIG. 3, the horizontal widener 302 has an input terminal 314 connected to a series of six clock delays 316 through 326. The output of an OR gate 328 is connected to an output terminal 330, and seven inputs of the OR gate 328 are respectively connected to the input terminal 314 and the ends of the clock delays 316-326. Any motion signal having an amplitude of 1 indicating the presence of a phenomenon such as motion will be repeated six times at the output terminal 330.

The vertical widener 304 comprises four 1-H delays 332, 334, 336, and 338 connected in series to an input terminal 331 and OR gate 340 of which the output is connected to an output terminal 342 and five inputs are respectively connected to the input terminal 331 and the ends of the 1-H delays 332-338.

The motion signals having the logic value of O pass through horizontal widener circuits 302 and vertical widener circuit 304 without delay, whereas the logic value of 1, indicating the presence of a phenomenon such as motion, is repeated so as to form a rectangle of logic 1's that is 7 clock cycles wide and 5 lines high.

The line signal spreader 306 is coupled to the output terminal 344 of the vertical widener 304 and functions to produce a ramp of increasing signal values along a line that increases from the value of 0 to a maximum, such as 7, during the first 6 motion signal periods referred to. It then holds the maximum value as long as 1's appear at the terminal 344, and when they cease, it produces a ramp of decreasing signal values along the line over a period of 6 clock cycles. This is done in the same way along the line whenever the motion signal assumes the logic value of 1, and along the 4 succeeding lines so that there are 5 identical lines.

For performing the line signal spreading function just described, a MUX 346 has an output 348, an input labeled 0, an input labeled 1 and a switching control input 350 to which logical values of 0 and 1 may be applied. When a logic 0 is applied to the control input 350, the output 348 is connected to the input labeled 0, and when a logic 1 is applied to the input 350, the output 348 is connected to the input labeled 1. A one clock delay element 352 and a generator 354 that performs the function $f(x) = x - 1$ are connected in series between the output 348 and the input labeled 0. The generator 354 cannot go below a value of 0. Thus, when no motion is detected and a logic 0 is at the input terminal 300, logic 0's are passed through the widener circuits 302 and 304 to the terminal 344, and the output 348 of the MUX 346 will be 0. If the signal at the output 348 of the MU 346 should be other than 0, it will be reduced to 0 in a maximum of 4 clock cycles by the operation of the generator 354. As will be seen, the MUX 346 will produce the ramp of decreasing values.

The ramp of increasing values to is formed by MUX 356. It has an output 358 that is connected to the input of MUX 346 that is labeled 1, an input labeled 0, an input labeled 1 and a switching control input 360 to which logic values of 0 to 1 may be applied. As in the MUX 346, a logic 1 at the control input 360 connects the output 358 to the input labeled 1, and a logic 0 at the control 360 connects the output 358 to the input labeled 0. A one clock delay 362 and a generator 364 that performs the function f(x)=x+1 are connected in series between the output 358 and the input labeled 1. The generator 364 cannot produce a signal value above some selected maximum, such as 7. The input of the MUX 356 that is labeled 0 is coupled to the output 348 of the MUX 346.

For making the signal values for corresponding pixels along the scan lines available, the vertical signal spreader 308 comprise four 1-H delays 366, 368, 370 and 372 and an adder 374 for adding the output 348 and the outputs of the four 1-H delays 366 through 372.

Here, the motion signal values at the output 348 and at the ends of the four 1-H delays 366 through 372 that are remote from the output 348 could be respectively weighted before they are combined in the means for combining them, that is, an adder 374. Also, the temporal spreader 310 is suitably composed of a low-pass filter. It provides gradual transitions between still and motion portions of a scene in the temporal domain. The output of the temporal spreader 310 is supplied to the control switch 50 of FIG. 1 through an output line 312.

In FIG. 1, the control switch 50 allows the output of the first subtracter 30 to be transmitted to the input terminal of the second absolute value device 71 or to be blocked out therefrom according to the output of the first signal spreader 40. In more detail, the control switch 50 is used to operate logically in response to the output of the first subtracter 30 and the output of the first signal spreader 40, to eliminate the errors contained in the output of the first subtracter 30. The control switch 50 corrects the errors, by allowing the output of the first subtracter 30 to be transmitted to the second absolute value device 71 as the motion signal only when the output signal of the signal spreader 40 is logically high (or low), that is, when the image is moved (or not moved).

The second absolute value device 71 converts the difference signal between frames of the unfolded luminance signal having both the positive and the negative values through the control switch 50 into only the positive signal.

In order to eliminate the minute noise components contained in the difference signal between frames of the unfolded luminance signal, the second threshold value detector 81 detects the difference signal, between frames of the luminance signal having values larger than the predetermined threshold value among the output signals of the second absolute value device 71, and supplies the resultant difference signal to the second signal spreader 41.

The second signal spreader 41 spreads the difference signal between the frames of the positive unfolded luminance signal, as supplied from the second threshold value detector 81, in the temporal, vertical and horizontal directions, and supplies the resultant spread difference signal through an output line 15 to the control terminal of the soft switch (not shown) as the motion signal.

At this time, since the unfolded luminance signal has a phase difference of 180 degrees between frames due to the folding carrier, the difference signal between frames has a larger noise component than that of the difference signal between alternate frames. Accordingly, it is desirable that the predetermined threshold value of the fast threshold value detector 80 is a larger value than the second threshold value detector 81.

Also, the first signal spreader 40 is arranged to provide spreading over a larger area than the second signal spreader 41. The actual motion between frames cannot be followed, since the difference signal between alternate frames is detected a frame later than the difference signal between frames. Accordingly, to allow for the lag in detecting the difference signal between alternate frames, the spreading of the motion signal responsive to the difference signal between alternate frames is made larger than the spreading of the motion signal responsive to the difference signal between frames. The construction of and operation of the second signal spreader 41 is otherwise very similar to that of the first signal spreader 40 described above; thus a detailed description of the second signal spreader 41 is omitted.

The construction of and operation of the second signal spreader 41 is very similar to that of the first signal spreader 40 described above. Thus, a detailed description is omitted.

Figure 4:
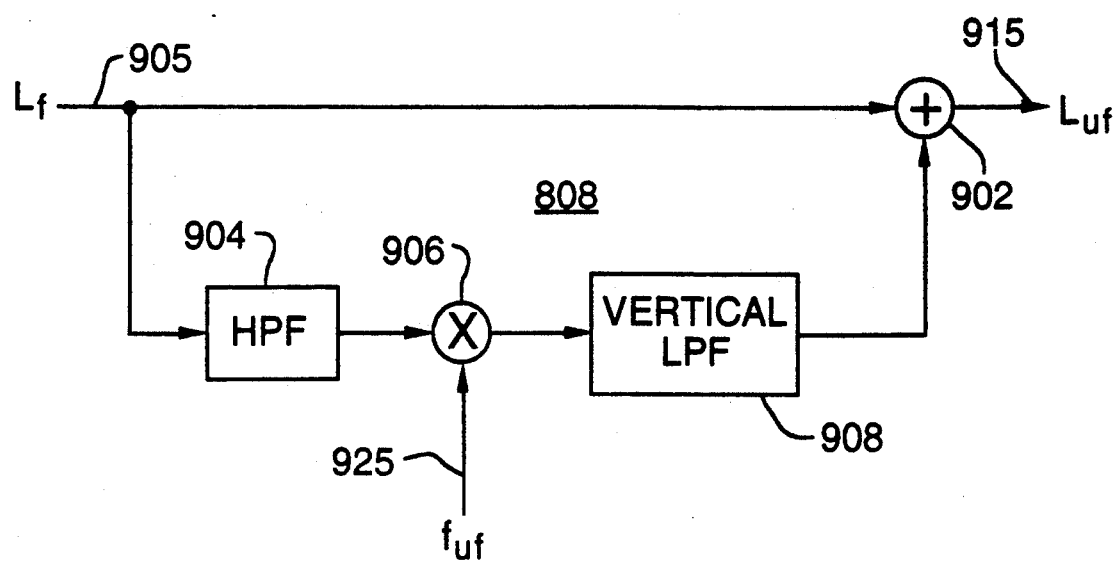
FIG. 4 is a circuit diagram of unfolding circuitry suitable for regenerating a full-bandwidth, wide-spectrum luminance signal Luf, proceeding from the reduced-bandwidth folded-spectrum of a folded-luminance signal Lf, which unfolding circuitry is of the type shown in U.S. Pat. No. 5,113,262 issued May 12, 1992, to the inventors and others.

FIG. 4 shows unfolding circuitry suitable for regenerating the full-bandwidth, wide-spectrum luminance signal Luf, proceeding from the reduced-bandwidth folded-spectrum of a folded-luminance signal Lf comprising a succession of digital samples supplied at a sampling rate. This unfolding circuitry is particularly suited to the improved video signal recording system described in U.S. Pat. No. 5,113,262 in which a folded-luminance signal is used to frequency modulate the luminance carrier, which is combined with an amplitude-modulated 629 KHz color-under carrier signal for recording on the video tape. The folded-luminance signal is recovered during playback by FM discrimination of the luminance carrier and is likely to contain remnants of the color-under signal. The unfolded luminance signal Luf is supplied from the FIG. 4 unfolding circuitry to the FIG. 1 adaptive filter circuitry, the circuitry of FIGS. 4 and 1 combining to form an adaptive unfolding circuit.

In FIG. 4, an input terminal 905 receptive of the folded-luminance signal Lf is coupled to an input terminal of a high pass filter (HPF) 904 and a first input terminal of an adder 902. An output terminal of the adder 902 is coupled to an output terminal 915. The output terminal 915 produces the unfolded luminance signal Luf, which is supplied to the remainder of the adaptive unfolding circuit illustrated in FIG. 1.

An output terminal of the HPF 904 is coupled to an input terminal of a modulator 906. An output terminal of the modulator 906 is coupled to an input terminal of a vertical low pass filter (LPF) 908. An output terminal of the vertical LPF 908 is coupled to a second input terminal of the adder 902. An input terminal 925 is coupled to a source (not shown) of an unfolding carrier signal fuf. The input terminal 925 is coupled to a second input terminal of the modulator 906.

In operation, input signal Lf is the limited-bandwidth folded luminance signal. The horizontal HPF 904 filters out the frequencies below the folded luminance signal containing the remnants of the color-under signal. When the sideband luminance is folded around a folding carrier at about 5 MHz by the record circuitry, the highest frequency luminance signal, at about 4.2 MHz is folded to about 800 kHz. Thus, the break frequency of the horizontal HPF 904 is preferably about 750 kHz. Then, the modulator 906 responds to the high-pass-filtered signal and to an unfolding carrier ff, which has the same about 5 MHz frequency as the folding carrier, to generate a demodulated signal. The modulator 906 may be constructed in a known manner using a four quadrant multiplier, or may be a +1,−1 type modulator using a clock signal at one half the sampling frequency.

The demodulated signal from modulator 906 is then filtered by the vertical LPF 908. The processing performed by vertical LPF 908 may also be described as averaging, which increases the signal-to-noise ratio of the resulting signal. The adder 902 adds this signal to the received folded luminance signal Lf from the input terminal 905. The resulting unfolded signal Luf consists of a full-bandwidth unfolded luminance signal centered around temporal, vertical and horizontal DC, and an image of the full-bandwidth luminance signal centered about the unfolding carrier which has frequency at one-half the maximum temporal frequency, at one-half the maximum vertical frequency and at a horizontal frequency of about 5 MHz. This image of the luminance signal must be removed, and this removal is carried out in the FIG. 1 adaptive filter circuitry.

As described above, according to the present invention, by utilizing the property of the unfolded luminance signal having the same phase relationship in every other frame, the errors contained in the difference signal between the frames can be eliminated by the difference signal between alternate frames, so that the accurate motion signal, i.e., the difference component between frames of the unfolded luminance signals, can be accurately detected.

What is claimed is:

1. A motion signal detecting circuit, comprising:
    means for eliminating a folding carrier and sidebands from an unfolded video signal to generate a prefiltered video signal;
    first comb filter means for detecting a first motion signal being a differential component of said prefiltered video signal; and
    means for generating a corrected motion signal by compensating for errors contained in said first motion signal.

2. A motion signal detecting circuit comprising:
    means for eliminating a folding carrier and sidebands from an unfolded video signal to generate a prefiltered video signal;
    first comb filter means for detecting a first motion signal being a differential component of said prefiltered video signal; and
    means for generating a corrected motion signal by compensating for errors contained in said first motion signal, which said error compensating means comprises;
    second comb filter means, for detecting a second motion signal by filtering said prefiltered video signal, and
    logical operation means for eliminating errors contained in said first motion signal by operating logically on said first motion signal in response to said second motion signal.

3. A motion signal detecting circuit as claimed in claim 2, wherein said second motion signal is a difference component between alternate frames of said prefiltered video signal.

4. A motion signal detecting circuit as claimed in claim 2, wherein said logical operation means comprises:
    first absolute value means for calculating first absolute values of said second motion signal;
    first threshold value detecting means for generating logic signals being a result of comparisons between said first absolute values and a first threshold value; and
    a control switch for generating said corrected motion signal by selectively providing said first motion signal according to said logic signals.

5. A motion signal detecting circuit as claimed in claim 4, wherein said logical operation means further comprises first signal spreader means coupled between said first threshold value detecting means and said control switch for spreading said logic signals received by said control switch temporally, vertically, and horizontally.

6. A motion signal detecting circuit as claimed in claim 5, further comprising:
    second absolute value means for calculating second absolute values of said corrected motion signal, and
    second signal spreader means for generating a spread motion signal by spreading said second absolute values temporally, vertically and horizontally.

7. A motion signal detecting circuit as claimed in claim 6, further comprising:
    second threshold value detector means, coupled between said second absolute value means and said second signal spreader means, for eliminating a noise component by selectively transmitting said second absolute values to said second signal spreader means when said second absolute values are larger than a second threshold value.

8. A motion signal detecting circuit as claimed in claim 7, wherein said error compensating means comprises:
    second comb filter means for detecting a second motion signal by filtering said prefiltered video signal received from said eliminating means; and
    logical operation means for eliminating errors contained in said first motion signal by logically operating on said first motion signal in response to said second motion signal.

9. A motion signal detecting circuit as claimed in claim 8, wherein said logical operation means comprises:
    first absolute value means for calculating first absolute values of said second motion signal;
    first threshold value detecting means for generating a logic signals by comparing by comparing said first absolute values with a first threshold value; and
    a control switch for generating said corrected motion signal by selectively providing said first motion signal according to said first absolute values.

10. A motion signal detecting circuit as claimed in claim 9, wherein said second threshold value is larger than said first threshold value.

11. A motion signal detecting circuit as claimed in claim 9, wherein said logical operation means comprises first signal spreader means, coupled between said first threshold value detector and said control switch, for spreading said logic signals temporally, vertically and horizontally.

12. A motion signal detecting circuit as claimed in claim 10, wherein said first signal spreader means is arranged to provide spreading over an area larger than the area of spreading provided by said second signal spreader means.

13. A motion signal detecting circuit as claimed in claim 9, wherein said first threshold value is larger than said second threshold value.

14. A motion signal detecting circuit as claimed in claim 2, wherein said logical operation means comprises:
   means for generating logic signals by horizontally, vertically and temporally spreading, absolute value calculation of, and threshold comparison of said second motion signal; and
   a control switch for generating said corrected motion signal by selectively provided said first motion signal according to said logic signals.

15. A motion signal detecting circuit as claimed in claim 1, further comprising means for spreading horizontally, vertically and temporally, calculating absolute values of, and eliminating a noise component of said corrected motion signal.

16. A motion signal detecting circuit as claimed in claim 1, further comprising soft switch means for combining in an output signal supplied therefrom spatially low-pass filtered luminance signals and temporally low-pass filtered luminance signals in respective portions determined in response to said spread motion signal.

17. A motion signal processing circuit as claimed in claim 16, wherein said soft switch means increases the proportion of said spatially low-pass filtered signals in response to an increase in a level of said spread motion signal.

18. A motion signal processing circuit as claimed in claim 1, further comprising frequency-unfolding means for generating said unfolded video signals by unfolding regenerated image signals having a high frequency component folded onto a low frequency component.

19. A motion signal processing circuit as claimed in claim 1, wherein said eliminating means comprises:
   horizontal comb filter means for generating sideband cancelled unfolded video signals by cancelling sidebands of said folding carriers in said unfolded video signals;
   vertical comb filter means for generating line cancelled unfolded video signals by cancelling line frequencies in said unfolded video signals;
   mixer means for generating said prefiltered video signal by proportionally mixing said line cancelled unfolded video signals and said sideband cancelled unfolded video signals;
   vertical edge detector means for detecting vertical discontinuities in said unfolded video signals during vertical scan and controlling said mixer means to increase a proportion of said sideband cancelled unfolded video signals and decrease a proportion of said line cancelled unfolded video signals in said prefiltered video signals; and
   means horizontal edge detector for detecting horizontal discontinuities in said unfolded video signals during horizontal scan and controlling said mixer means to increase a proportion of said line cancelled unfolded video signals and decrease a proportion of said sideband cancelled unfolded video signals in said prefiltered video signals.

20. A motion signal processing circuit as claimed in claim 7, wherein said second signal spreader means comprises:
   a horizontal widener for horizontally spreading motion regions in said second absolute values;
   a vertical widener for vertically spreading motion regions in said second absolute values; line signal spreader for horizontally smoothing said motion regions in said second absolute values vertically and horizontally spread by said vertical widener and said horizontal widener;
   a vertical signal spreader for vertically smoothing said motion regions in said second absolute values vertically and horizontally spread by said vertical widener and said horizontal widener; and
   a temporal spreader for generating said spread motion signal by temporally smoothing transitions between motion regions and still regions in said second absolute values vertically and horizontally smoothed by said line signal spreader and said vertical signal spreader.

21. A motion signal processing circuit as claimed in claim 20, wherein said horizontal widener comprises:
   a cascade connection of one clock period delays and an OR gate for generating horizontally spread motion regions by logically combining outputs from each of said one clock period delays.

22. A motion signal processing circuit as claimed in claim 20, wherein said vertical widener comprises:
   a first cascade connection of one horizontal scan period delays and an OR gate for generating vertically spread motion regions by logically combining outputs from each of said one horizontal scan period delays in said first cascade connection of one horizontal scan period delays.

23. A motion signal processing circuit as claimed in claim 20, wherein said vertical signal spreader comprises:
   a second cascade connection of one horizontal scan period delays and
   an adder for generating vertically smoothed motion regions by adding outputs from each of said one horizontal scan period delays in said second cascade connection of one horizontal scan period delays.

24. A motion signal processing circuit as claimed in claim 7, wherein said first signal spreader means comprises:
   a horizontal widener for horizontally spreading motion regions in said second absolute values;
   a vertical widener for vertically spreading motion regions in said second absolute values;
   a line signal spreader for horizontally smoothing said motion regions in said second absolute values vertically and horizontally spread by said vertical widener and said horizontal widener;
   a vertical signal spreader for vertically smoothing said motion regions in said second absolute values vertically and horizontally spread by said vertical widener and said horizontal widener; and
   a temporal spreader for generating said spread motion signal by temporally smoothing transitions between motion regions and still regions in said second absolute values vertically and horizontally smoothed by said line signal spreader and said vertical signal spreader.

25. A motion signal processing circuit as claimed in claim 24, wherein said horizontal widener comprises:
   a cascade connection of one clock period delays and an OR gate for generating horizontally spread motion regions by logically combining outputs from each of said one clock period delays.

26. A motion signal processing circuit as claimed in claim 24, wherein said vertical widener comprises:
   a first cascade connection of one horizontal scan period delays and an OR gate for generating vertically spread motion regions by logically combining outputs from each of said one horizontal scan period delays in said first cascade connection of one horizontal scan period delays.

27. A motion signal processing circuit as claimed in claim 24, wherein said vertical signal spreader comprises:
a second cascade connection of one horizontal scan period delays and
an adder for generating vertically smoothed motion regions by adding outputs from each of said one horizontal scan period delays in said second cascade connection of one horizontal scan period delays.

28. A motion signal detecting circuit, comprising:
means for eliminating a folding carrier and sidebands thereof from an unfolded video signal to generate a prefiltered video signal;
first comb filter means for detecting a first motion signal being a differential component of said prefiltered video signal;
second comb filter means for detecting a second motion signal by filtering said prefiltered video signal;
first absolute value means for calculating first absolute values of said second motion signal;
first threshold value detecting means for generating logic signals being a result of comparisons between said first absolute values and a first threshold value;
a control switch for generating a corrected motion signal by selectively providing said first motion signal according to said logic signals;
second absolute value means for calculating second absolute values of said corrected motion signal; and
second signal spreader means for generating a spread motion signal by spreading said second absolute values temporally, vertically and horizontally.

29. A motion signal detecting circuit as claimed in claim 1, further comprising:
absolute value means for calculating the absolute values of said corrected motion signal, and
signal spreader means for generating a spread motion signal by spreading said absolute values temporally, vertically and horizontally.

30. A motion signal detecting circuit as claimed in claim 29, further comprising:
threshold detector means, coupled between said absolute value means and said signal spreader means for eliminating a noise component by selectively transmitting from said absolute value means to said signal spreader means those of said absolute values which are larger than a threshold value.

31. A motion signal detecting circuit as claimed in claim 30 wherein said error compensating means comprises:
second comb filter means, for detecting a second motion signal by filtering said prefiltered video signal, and
logical operation means for eliminating errors contained in said first motion signal by operating logically on said first motion signal in response to said second motion signal.

32. A motion signal detecting circuit as claimed in claim 1 wherein said means for eliminating a folding carrier and sidebands from an unfolded video signal to generate a prefiltered video signal comprises filtering circuitry including
an input connection for receiving said unfolded video signal and
an output connection for supplying said prefiltered video signal as generated in response to said unfolded video signal received at said input connection thereof.

* * * * *